(12) United States Patent
Nakayama et al.

(10) Patent No.: US 7,745,504 B2
(45) Date of Patent: Jun. 29, 2010

(54) PROCESS FOR PRODUCING POROUS SPHERICAL POLYAMIDE PARTICLE

(75) Inventors: Kimio Nakayama, Chiba (JP); Tatsuya Shoji, Chiba (JP); Yukihiko Asano, Chiba (JP); Shigeru Yao, Chiba (JP)

(73) Assignee: Ube Industries, Ltd., Ubi-shi, Yamaguchi (JP)

( * ) Notice: Subject to any disclaimer, the term of this patent is extended or adjusted under 35 U.S.C. 154(b) by 523 days.

(21) Appl. No.: 11/883,503

(22) PCT Filed: Feb. 2, 2006

(86) PCT No.: PCT/JP2006/301800

§ 371 (c)(1),
(2), (4) Date: Aug. 1, 2007

(87) PCT Pub. No.: WO2006/082908

PCT Pub. Date: Aug. 10, 2006

(65) Prior Publication Data

US 2008/0161442 A1 Jul. 3, 2008

(30) Foreign Application Priority Data

Feb. 2, 2005 (JP) .............................. 2005-026966

(51) Int. Cl.
*C08J 3/12* (2006.01)
*C08J 3/14* (2006.01)

(52) U.S. Cl. ............................. 521/60; 521/61; 521/64; 521/183; 521/184; 521/189

(58) Field of Classification Search ...................... None
See application file for complete search history.

(56) References Cited

FOREIGN PATENT DOCUMENTS

| JP | 2000-136249 | | 5/2000 |
|---|---|---|---|
| JP | 2002080629 | A * | 3/2002 |
| JP | 2002-143680 | | 5/2002 |

OTHER PUBLICATIONS

International Preliminary Report on Patentability and Written Opinion of the International Searching Authority mailed Aug. 16, 2007, 5 pages, for International Application No. PCT/JP2006/301800, Full. International Search Report mailed Feb. 28, 2006 for International Application No. PCT/JP2006/301800.

* cited by examiner

*Primary Examiner*—Irina S Zemel
(74) *Attorney, Agent, or Firm*—Nixon Peabody LLP; Jeffrey L. Costellia

(57) ABSTRACT

Porous spherical particles of polyamide 11 or polyamide 12 can be produced by an industrially advantageous process which comprises the steps of mixing a polyamide solution of polyamide 11 or polyamide 12 dissolved in a phenol compound and a low molecular weight aliphatic alcohol which is a poor solvent for the polyamides but is well compatible with the phenol compound in the presence of a high molecular weight alkylene glycol to prepare a mixture solution having an initial viscosity of 10 mPa·s or more, and allowing the mixture solution to stand, to precipitate polyamide particles.

16 Claims, 1 Drawing Sheet

FIGURE
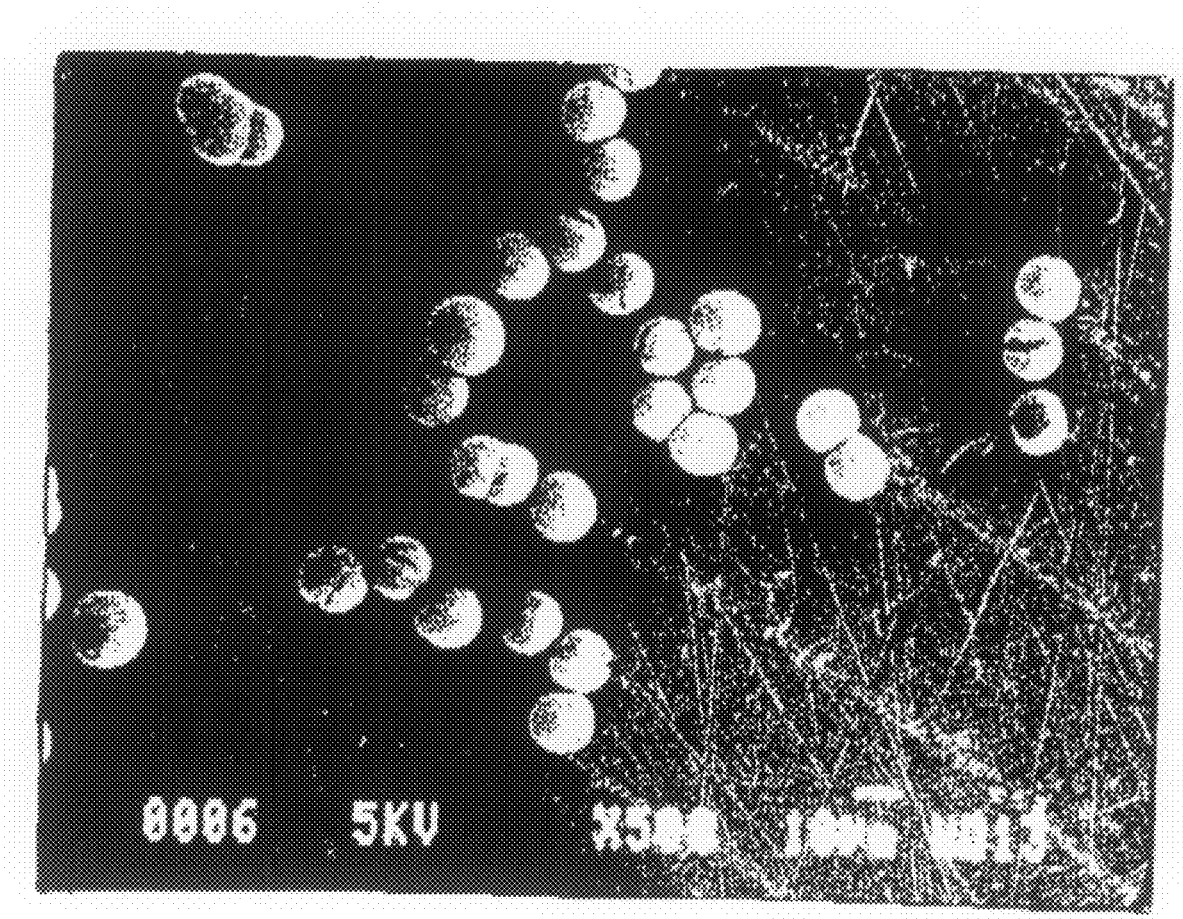

PROCESS FOR PRODUCING POROUS SPHERICAL POLYAMIDE PARTICLE

FIELD OF THE INVENTION

The present invention relates to a process for producing porous spherical polyamide particles.

BACKGROUND OF THE INVENTION

The porous spherical polyamide particles are studied for the use as components for cosmetics such as cleansing mask or for packing material for chromatographic apparatus. Further, the porous spherical polyamide particles are studied for the use as catalyst carriers or adsorbents in food industry and medical fields. Furthermore, the porous spherical polyamide particles are studied for the use as carriers for coloring materials to provide a toner for electrographic duplicating machines or to provide material for display devices.

It is known that the porous spherical polyamide particles can be produced by a solvent-induced phase separation process. The solvent-induced phase separation process comprises mixing a polyamide solution comprising polyamide dissolved in a solvent and a solvent that is a poor solvent (or a non-solvent) for the polyamide but compatible with the solvent, to cause phase separation, whereby precipitating porous spherical polyamide particles. It is said that the solvent-induced phase separation process is advantageous because uniform porous spherical polyamide particles can be easily produced by appropriately selecting the solvent for polyamide and the poor solvent.

Japanese patent provisional publication 3-26729 discloses a process for producing porous polymer microparticles which comprises uniformly dispersing a polymer solution which is prepared by dissolving crystalline polymer in a solvent (first solvent) in a poor solvent (second solvent) having a higher hydrogen-bonding factor than that of the first solvent. The working examples of the Japanese publication describe a process for producing porous spherical polyamide 66 (nylon 66) particles using dimethylformamide (as first solvent) and ethylene glycol monomethyl ether (as poor solvent).

Japanese patent provisional publication 2002-80629 discloses a process for producing porous spherical polyamide particles which comprises the steps of mixing a polyamide solution with water and a poor solvent for polyamide to give a temporarily uniform solution and precipitating the polymer. The working examples of the Japanese publication describe a process for producing porous spherical particles of polyamide 6 (nylon 6) or polyamide 66 using m-cresol or formic acid as the solvent and methanol as the poor solvent.

Polyamide 11 (nylon 11) and polyamide 12 (nylon 12) are advantageous over polyamide 6 and polyamide 11 from the view point of low moisture absorption.

The present inventors found, however, that the known solvent-induced phase separation process applied to polyamide 11 or polyamide 12 insufficiently precipitate the porous particles and further the precipitated porous primary particles are apt to aggregate.

SUMMARY OF THE INVENTION

Accordingly, it is the object of the present invention to provide an industrially advantageous process for producing porous spherical particles of polyamide 11 or polyamide 12 utilizing a solvent-induced phase separation process but minimizing aggregation of the particles.

The present inventors have discovered that porous spherical polyamide particles can be obtained in a relatively short time with almost no agglomeration if a polyamide solution of a polyamide selected from the group consisting of polyamide 11 or polyamide 12 dissolved in a phenol compound and a low molecular weight aliphatic alcohol which is a poor solvent for the polyamides but is compatible with the phenol compound are mixed in the presence of a high molecular weight alkylene glycol to prepare a mixture solution having an initial viscosity of 10 mPa·s or more, and the mixture solution is then allowed to stand. It is understood that the high molecular weight alkylene glycol serves as a nucleus-forming agent for acceleration of precipitation of the polyamide and also serves as a viscosity-increasing agent for increasing the mixture solution whereby suppressing short distance movement of the precipitated particles (which causes agglomeration of the particles).

Accordingly, the present invention resides in a process for producing porous polyamide particles which comprises the steps of mixing a polyamide solution of polyamide 11 or polyamide 12 dissolved in a phenol compound and a low molecular weight aliphatic alcohol which is a poor solvent for the polyamides but is compatible with the phenol compound in the presence of a high molecular weight alkylene glycol to prepare a mixture solution having an initial viscosity of 10 mPa·s or more, and allowing the mixture solution to stand, to precipitate the polyamide particles.

The process of the invention makes it possible to produce porous spherical polyamide particles of polyamide 11 or polyamide 12 with industrially advantageous procedures. The porous spherical polyamide particles produced by the process of the invention can be utilized as components for cosmetics such as cleansing mask or for packing material for chromatographic apparatus. Further, the porous spherical polyamide particles can be utilized as catalyst carriers or adsorbents in food industry and medical fields. Furthermore, the porous spherical polyamide particles can be utilized as carriers for coloring materials to provide a toner for electrographic duplicating machines or to provide material for display devices.

BRIEF DESCRIPTION OF DRAWING

The attached FIGURE is an electron microscopic photograph of polyamide 12 particles produced in Example 1.

PREFERRED EMBODIMENTS OF THE INVENTION

Preferred embodiments of the process of the invention for producing porous spherical polyamide particles are described below.

(1) The mixture solution is prepared by mixing the polyamide solution containing the high molecular weight alkylene glycol with the low molecular weight aliphatic alcohol.

(2) The mixture solution is prepared by mixing the polyamide solution with the low molecular weight aliphatic alcohol containing the high molecular weight alkylene glycol.

(3) The mixture solution is prepared by simultaneously mixing the polyamide solution, the low molecular weight aliphatic alcohol, and the high molecular weight alkylene glycol.

(4) The mixture solution is prepared by mixing the polyamide solution and the low molecular weight aliphatic alcohol, and then mixing the high molecular weight alkylene glycol.

(5) The mixture solution is prepared to have a polyamide concentration in the range of 0.05 to 20 wt. %.

(6) The mixture solution is prepared to have a high molecular weight alkylene glycol concentration in the range of 0.5 to 10 wt. %.

(7) The phenol compound is phenol.

(8) The low molecular weight aliphatic alcohol is a mixture of a trihydric alcohol and a low molecular weight alkylene glycol or a mixture of a trihydric alcohol and a monohydric alcohol.

(9) The trihydric alcohol is glycerol.

(10) The low molecular weight aliphatic alcohol is a mixture of glycerol and a low molecular weight alkylene glycol, and the low molecular weight alkylene glycol is ethylene glycol.

(11) The low molecular weight aliphatic alcohol is a mixture of glycerol and a monohydric alcohol, and the monohydric alcohol has 1 to 6 carbon atoms.

(12) The high molecular weight alkylene glycol is polyethylene glycol having a number average molecular weight of 1,000 or more, polypropylene glycol having a number average molecular weight of 1,000 or more, or a mixture thereof.

(13) The initial viscosity of the mixture solution is not higher than 200 Pa·s.

(14) The step of allowing the mixture solution to stand is performed for at least 30 minutes.

(15) The step of allowing the mixture solution to stand is performed at a temperature in the range of 20 to 80° C.

The process of the invention for producing porous spherical polyamide (polyamide 11 or polyamide 12) particles is described below in more detail.

A polyamide solution prepared by dissolving polyamide in a phenol compound and a lower molecular weight aliphatic alcohol that is a poor solvent (non-solvent) for the polyamide but is compatible with the phenol compound are mixed in the presence of a high molecular weight alkylene glycol, to give a mixture solution having an initial viscosity of 10 mPa·s or more. The mixture solution has a temperature preferably in the range of 20 to 80° C., more preferably in the range of 25 to 40° C. The mixture solution preferably has an initial viscosity of not higher than 200 Pa·s.

The polyamide used for the production of the porous spherical particles can be in the form of powder, fibers, sheet, flakes, or liquid. The polyamide has a number average molecular weight preferably in the range of 2,000 to 100,000, more preferably in the range of 5,000 to 40,000.

The phenol compound used as a solvent for the polyamide preferably dissolves the polyamide in an amount of 0.1 wt. % or more at 25° C. Examples of the phenol compounds include phenol, cresol, cresylic acid, and chlorophenol. Preferred are phenol and cresol. Most preferred is phenol. The phenol compounds can be employed singly or in combination.

The polyamide solution has a polyamide concentration preferably in the range of 0.1 to 30 wt. %, more preferably in the range of 0.2 to 25 wt. %.

A freezing point depressant can be incorporated into the polyamide solution. The freezing point depressant can be a low molecular weight aliphatic alcohol which is a poor solvent for the polyamide but compatible with the phenol compound. The freezing point depressant can be incorporated in an amount causing no precipitation of polyamide in the polyamide solution, for instance, in an amount of 0.1 to 30 wt. %, preferably in an amount of 0.2 to 20 wt. %. Preferred examples of the low molecular weight aliphatic alcohols include ethylene glycol, triethylene glycol, propylene glycol, glycerol and diglycerol.

In the invention, a low molecular weight aliphatic alcohol which is compatible with the phenol compound is used as the poor solvent. The low molecular weight aliphatic alcohol is an alcohol having a molecular weight of 200 or less. The low molecular weight aliphatic alcohol preferably does not dissolve the polyamide in an amount of 0.01 wt. % or more at 25° C.

The low molecular weight aliphatic alcohol preferably is a mono- to tri-hydric alcohol, though a tetra- or more-hydric alcohol can be used. The low molecular weight aliphatic alcohol can be a mixture of two or more alcohols.

The monohydric alcohol preferably has 1 to 6 carbon atoms, more preferably 2 to 4 carbon atoms. The monohydric alcohol can have a branch group. Examples of the monohydric alcohols include methanol, ethanol, 1-propanol, 2-propanol, 1-butanol, 2-butanol, 2-methyl-1-propanol, 2-methyl-2-propanol, 1-pentanol, and 1-hexanol. Preferably, the monohydric alcohol is 1-propanol.

The dihydric alcohol preferably is a low molecular weight alkylene glycol having a viscosity of 40 mPa·s or less at 30° C. Examples of the low molecular weight alkylene glycols include ethylene glycol, triethylene glycol, and propylene glycol. Preferably, the low molecular weight alkylene glycol is ethylene glycol.

The trihydric alcohol preferably is glycerol.

An example of the tetra- or more-hydric alcohol is diglycerol (2,3,2',3'-tetraoxypropyl ether).

The alcohol mixture preferably is a mixture of a trihydric alcohol and a low molecular weight alkylene glycol or a mixture of a trihydric alcohol and a monohydric alcohol. The alcohol mixture of a trihydric alcohol and a low molecular weight alkylene glycol preferably contains 10 to 60 wt. % (more preferably 20 to 50 wt. %) of the low molecular weight alkylene glycol. The alcohol mixture of a trihydric alcohol and a monohydric alcohol preferably contains 10 to 50 wt. % (more preferably 20 to 40 wt. %) of the monohydric alcohol.

In the invention, the high molecular weight alkylene glycol is solid at 30° C. or has a viscosity of 100 mPa·s or more at 30° C. It is preferred that the high molecular weight alkylene glycol is solid at 30° C. or has a viscosity of 200 mPa·s or more at 30° C. Examples of the high molecular weight alkylene glycols include polyethylene glycol having a number average molecular weight of 1,000 or more (specifically 1,100 to 5,000) and polypropylene glycol having a number average molecular weight of 1,000 or more (specifically 1,100 to 5,000). The high molecular weight alkylene glycols can be used singly or in combination.

In the preparation of a mixture solution, the polyamide solution, low molecular weight aliphatic alcohol and high molecular weight alkylene glycol can be mixed in any orders, provided that the resulting mixture solution would have an initial viscosity of 10 mPa·s or more. The initial viscosity means a viscosity of the mixture solution having clear phase which is observed within 20 minutes (preferably 15 minutes) after the mixture solution was prepared.

The mixture solution can be prepared by one of the following procedures:

1) a procedure of mixing the polyamide solution containing the high molecular weight alkylene glycol with the low molecular weight aliphatic alcohol;

2) a procedure of mixing the polyamide solution with the low molecular weight aliphatic alcohol containing the high molecular weight alkylene glycol;

3) a procedure of simultaneously mixing the polyamide solution, the low molecular weight aliphatic alcohol, and the high molecular weight alkylene glycol; and 4) a procedure of mixing the polyamide solution with the low molecular weight aliphatic alcohol and subsequently (preferably within 10 minutes) admixing the high molecular weight alkylene glycol.

In the procedure of preparing the mixture solution, the solution can be stirred by appropriate means.

The polyamide solution is mixed preferably in such an amount that the resulting mixture solution contains the polyamide in an amount of 0.05 to 20 wt. %, more preferably 0.1 to 10 wt. %. The high molecular weight alkylene glycol is mixed preferably in such an amount that the resulting mixture solution contains the high molecular weight alkylene glycol in an amount of 0.5 to 10 wt. %, more preferably 1 to 8 wt. %. The low molecular weight aliphatic alcohol is mixed in any amounts under the condition that polyamide particles would precipitate. Preferably, the low molecular weight aliphatic alcohol is incorporated into the mixture solution in an amount of 15 to 80 wt. %.

The mixture solution prepared as above is stored, to precipitate polyamide particles. The mixture solution is preferably allowed to stand without vibration. The polyamide is preferably precipitated from the mixture solution at a temperature (storage temperature) in the range of 20 to 80° C., more preferably 25 to 40° C. The precipitation of the polyamide particles from the mixture solution generally begins at a lapse of 30 minutes or more, specifically 30 to 200 minutes. The mixture solution from which the polyamide particles begin to precipitate is preferably stored for additional 5 to 100 hours.

The precipitated polyamide particles can be recovered by the conventional methods such as filtration, decantation, and centrifugal separation. The separated polyamide particles are preferably washed and dried. The polyamide particles can be washed with methanol or acetone. The polyamide particles can be dried by the conventional methods such as air-drying, heat-drying, or vacuum drying. The drying procedure is preferably carried at a temperature lower than the melting temperature of the polyamide, and specifically at a temperature of 50 to 120° C.

The particles of polyamide 11 or polyamide 12 produced by the process of the invention are porous, spherical particles.

The porous spherical polyamide particles produced by the process of the invention have a number average particle diameter generally in the range of 0.1 to 100 μm, preferably in the range of 0.3 to 50 μm, most preferably 0.5 to 25 μm. The porous spherical polyamide particles have a ratio of a volume average particle diameter (Dv) to a number average particle diameter (Dn), that is, a particle size distribution index (PDI=Dv/Dn) generally in the range of 1.0 to 1.5, preferably in the range of 1.0 to 1.3.

The porous spherical polyamide particles have a BET specific surface area generally in the range of 0.1 to 80 m$^2$/g, preferably 1 to 60 m$^2$/g, most preferably 2 to 50 m$^2$/g.

The porous spherical polyamide particles have a porosity index (RI=S/S$_0$, wherein S$_0$ is a specific surface area based on the number average particle diameter and represented by the formula S$_0$=6/(ρ×Dn) in which ρ is a density of the particles and Dn is the number average particle diameter, and wherein S is the BET specific surface area) generally in the range of 3 to 100, preferably in the range of 5 to 70.

The porous spherical polyamide particles have an average pore diameter generally in the range of 0.01 to 0.20 μm, preferably in the range of 0.02 to 0.1 μm.

The present invention is further described by the below-given working examples. In the examples, the determinations of the viscosity of liquid, and the average particle diameter, specific surface area, average pore diameter and crystallinity of the particles are performed in the following manner.

[Determination of Viscosity]

The viscosity of liquid is determined by means of a Canon-Fenske viscometer and obtained from a ratio to the viscosity of m-cresol at 30° C.

[Determinations of Number Average Particle Diameter and Volume Average Particle Diameter]

The appearance, porosity and particle diameters of the polyamide particles are observed and determined by means of a scanning electron microscope (SEM). The particle diameter of the spherical particle is determined by obtaining a SEM photograph. The particle diameter of a non-spherical particle is determined by obtaining a projected circle.

The number average particle diameter (Dv) and volume average particle diameter (Dn) are obtained on 100 particles utilizing the below-given formulas (1) and (2):

$$Dn = \sum_{i=1}^{n} Xi/n \tag{1}$$

$$Dv = \sum_{i=1}^{n} Xi^4 \bigg/ \sum_{i=1}^{n} Xi^3 \tag{2}$$

In the formulas (1) and (2), Xi means a particle diameter of each particle, n is the number of particles (100), Dn is a number average particle diameter, and Dv is a volume average particle diameter.

[Determination of Specific Surface Area]

The specific surface area of the polyamide particles is determined by BET 3-points methods utilizing nitrogen adsorption.

[Determination of Pore Diameter Distribution]

The pore diameter distribution of the polyamide particles is represented by an average pore diameter which is determined in the range of 0.0034 to 400 μm by means of a mercury porosimeter.

[Determination of Heat of Fusion and Crystallinity]

The heat of fusion of the polyamide particles is measured by means of a differential scanning calorimeter (DSC). In the measurement using DSC, the sample is heated in a nitrogen gas from room temperature at a temperature increase rate of 5° C./min. The heat of fusion is calculated from an area of heat absorption peak in the temperature range of 120 to 230° C. The crystallinity of the polyamide particles is obtained from a ratio of the obtained heat of fusion to the heat of fusion of crystalline polyamide. The heat of fusion of crystalline polyamide 12 is 209 J/g (according to Muller A., et al., Kunststoffe 50, 203 (1960) and Gerolewski S., et al., Colloid and Polymer Sci., 258, 1130 91980).

Example 1

(1) Preparation of Polyamide 12 Solution

Containing a High Molecular Weight Alkylene Glycol

To 98.0 g of phenol heated to 70° C. were added 10.0 g of ethylene glycol, 2.5 g of polyethylene glycol (number average molecular weight: 1,540), and 2.5 g of polypropylene glycol (number average molecular weight: 3,000). The resulting mixture was stirred to give a solvent mixture. In the solvent mixture was poured 2.0 g of polyamide 12 (number average molecular weight: 14,000). The resulting mixture was heated to 70° C. and stirred for 24 hours, to completely dissolve the polyamide in the mixture. Thus, a polyamide solution having a polyamide concentration of 1.74 wt. % and containing 1.74 wt. % of a high molecular weight alkylene glycol was prepared. The polyamide solution was adjusted to reach 30° C. and measured on its viscosity by means of a Canon-Fenske viscometer. The measured viscosity was 31 mPa·s.

(2) Preparation of Alcohol Mixture 14.0 g of glycerol and 9.5 g of ethylene glycol were mixed to give an alcohol mixture. The alcohol mixture was adjusted to reach 30° C. and measured on its viscosity. The measured viscosity was 75 mPa·s.

(3) Preparation of Mixture Solution and Precipitation of Polyamide Particles

Production of Polyamide Particles

The polyamide solution (solution temperature: 30° C.) prepared in (1) above and the alcohol mixture (solution temperature: 30° C.) prepared in (2) above were mixed and stirred for 10 minutes by means of a stirrer (three-one motor, rotation: 300 rpm) to give a mixture solution. Immediately after termination of the stirring, the mixture solution was measured on its viscosity (initial viscosity). The measured viscosity was 36 mPa·s (30° C.). In the mixture solution measured on the viscosity, there was not observed cloudiness originating from precipitation of polyamide particles. The mixture solution was allowed to stand at 30° C. At a lapse of 90 minutes after termination of stirring, the mixture solution began to turn cloudy due to precipitation of polyamide particles. Subsequently, the cloudy mixture solution was further allowed to stand at 30° C. for 24 hours.

The produced polyamide particles were collected on filter paper and washed with two portions of 1,000 mL of methanol on the filter paper. Thereafter, the polyamide particles were dried in vacuo at 60° C. for 12 hours. The dried polyamide particles were observed by a scanning electron microscope. The electron microgram is shown in FIGURE. As is shown in FIGURE, the produced polyamide particles are porous spherical particles. Almost no agglomerated particles comprising three or more particles (primary particles) were observed. The number average molecular weight of the primary particles was 15.1 μm; the volume average molecular weight was 15.4 μm; a particle size distribution index was 1.02; the specific surface area was 5.4 m$^2$/g; the porosity index was 15.1; the average pore diameter was 0.026 μm, the heat of fusion was 145 J/g; and the crystallinity was 69%.

Example 2

(1) Preparation of Polyamide 12 Solution

To 98.0 g of phenol heated to 70° C. was added 10.0 g of ethylene glycol. The resulting mixture was stirred to give a solvent mixture. In the solvent mixture was poured 2.0 g of polyamide 12 (number average molecular weight: 14,000). The resulting mixture was heated to 70° C. and stirred for 24 hours, to completely dissolve the polyamide in the mixture. Thus, a polyamide solution having a polyamide concentration of 1.82 wt. % was prepared. The polyamide solution was adjusted to reach 30° C. and measured on its viscosity. The measured viscosity was 26 mPa·s.

(2) Preparation of Alcohol Mixture Containing a High Molecular Weight Alkylene Glycol To 14.0 g of glycerol were added 9.5 g of ethylene glycol, 2.5 g of polyethylene glycol (number average molecular weight: 1,540), and 2.5 g of polypropylene glycol (number average molecular weight: 3,000). The resulting mixture was then stirred to give an alcohol mixture containing a high molecular weight alkylene glycol. The alcohol mixture was adjusted to reach 40° C. and measured on its viscosity. The measured viscosity was 64 mPa·s. It was confirmed that the alcohol mixture solidifies at 30° C. and hence the viscosity cannot be measured.

(3) Preparation of Mixture Solution and Precipitation of Polyamide Particles

Production of Polyamide Particles

The polyamide solution (solution temperature: 30° C.) prepared in (1) above and the alcohol mixture (in the form of solid, temperature: 30° C.) prepared in (2) above were mixed and stirred for 10 minutes under the same conditions as in Example 1 to give a mixture solution. Immediately after termination of the stirring, the mixture solution was measured on its viscosity (initial viscosity). The measured viscosity was 36 mPa·s (30° C.). In the mixture solution measured on the viscosity, there was not observed cloudiness originating from precipitation of polyamide particles. The mixture solution was allowed to stand at 30° C. At a lapse of 115 minutes after termination of stirring, the mixture solution began to turn cloudy due to precipitation of polyamide particles. Subsequently, the cloudy mixture solution was further allowed to stand at 30° C. for 24 hours.

The produced polyamide particles were collected and washed in the same manner as in Example 1, and then dried in vacuo at 60° C. for 12 hours. The dried polyamide particles were observed by a scanning electron microscope. The produced polyamide particles are porous spherical particles. Almost no agglomerated particles comprising three or more particles (primary particles) were observed. The number average molecular weight of the primary particles was 13.1 μm; the volume average molecular weight was 13.6 μm; a particle size distribution index was 1.04; the specific surface area was 4.9 m$^2$/g; the porosity index was 11.8; the average pore diameter was 0.030 µm, the heat of fusion was 137 µg; and the crystallinity was 66%.

Example 3

The procedures of Example 1 were repeated except that 99.5 g of phenol and 0.5 g of polyamide 12 were employed and that the polyamide concentration in the polyamide solution was adjusted to 0.43 wt. %. The viscosity at 30° C. of the polyamide solution was 15 mPa·s.

The initial viscosity of the mixture solution was 20 mPa·s (at 30° C.). The mixture solution turned cloudy at a lapse of 140 minutes.

The produced polyamide particles were observed by a scanning electron microscope. The polyamide particles are porous spherical particles. Almost no agglomerated particles comprising three or more particles (primary particles) were observed. The number average molecular weight of the primary particles was 6.3 µm; the volume average molecular weight was 7.2 µm; a particle size distribution index was 1.14; the specific surface area was 8.3 m²/g; the porosity index was 9.67; the average pore diameter was 0.050 µm, the heat of fusion was 120 J/g; and the crystallinity was 57%.

Example 4

The procedures of Example 1 were repeated except that the alcohol mixture was prepared by mixing 23 g of glycerol and 12 g of 1-propanol. The viscosity at 30° C. of the alcohol mixture was 55 mPa·s.

The initial viscosity of the mixture solution was 32 mPa·s (at 30° C.). The mixture solution turned cloudy at a lapse of 30 minutes.

The produced polyamide particles were observed by a scanning electron microscope. The polyamide particles are porous spherical particles. Almost no agglomerated particles comprising three or more particles (primary particles) were observed. The number average molecular weight of the primary particles was 9.1 µm; the volume average molecular weight was 9.3 µm; a particle size distribution index was 1.02; the specific surface area was 6.2 m²/g; the porosity index was 10.3; the average pore diameter was 0.080 µm, the heat of fusion was 122 J/g; and the crystallinity was 58%.

Reference Example

The procedures of Example 1 were repeated except that neither polyethylene glycol nor polypropylene glycol was incorporated into the polyamide solution. The viscosity at 30° C. of the polyamide solution was 26 mPa·s.

The initial viscosity of the mixture solution was 31 mPa·s (at 30%). The mixture solution turned cloudy at a lapse of 240 minutes.

The produced polyamide particles were observed by a scanning electron microscope. The polyamide particles are porous spherical particles. A large number of agglomerated particles comprising plural (4 to 5) particles (primary particles) were observed. The number average molecular weight of the primary particles was 13.7 µm; the volume average molecular weight was 14.9 µm; a particle size distribution index was 1.09; the specific surface area was 11.6 m²/g; the porosity index was 29.1; the average pore diameter was 0.10 µm, the heat of fusion was 97.5 J/g; and the crystallinity was 46.6%.

Example 5

The procedures of Example 1 were repeated except that 19 g of the glycerol for the preparing the alcohol mixture was used. The viscosity at 30° C. of the alcohol mixture was 140 mPa·s.

The initial viscosity of the mixture solution was 42 mPa·s (at 30° C.). The mixture solution turned cloudy at a lapse of 60 minutes.

The produced polyamide particles were observed by a scanning electron microscope. The polyamide particles are porous spherical particles. Almost no agglomerated particles comprising three or more particles (primary particles) were observed. The number average molecular weight of the primary particles was 11.2 µm; the volume average molecular weight was 13.5 µm; a particle size distribution index was 1.20; the specific surface area was 10.0 m²/g; the porosity index was 19.1; the average pore diameter was 0.080 µm, the heat of fusion was 125 J/g; and the crystallinity was 60%.

[Summary]

The composition of the mixture solution, initial viscosity, period for beginning cloudiness (cloudiness starting time), and presence of agglomerated polyamide particles in the produced polyamide particles are set forth in the following Table.

TABLE

| | Composition of mixture solution (wt. %) | | | | | | | Initial Viscosity | cloudiness starting |
|---|---|---|---|---|---|---|---|---|---|
| | PA | Ph | EG | Gr | Pr | PEG | PPG | (mPa · s) | time |
| Ex. 1 | 1.4 | 70.8 | 14.1 | 10.1 | — | 1.8 | 1.8 | 36 | 90 min. |
| Ex. 2 | 1.4 | 70.8 | 14.1 | 10.1 | — | 1.8 | 1.8 | 36 | 115 min. |
| Ex. 3 | 0.4 | 71.8 | 14.1 | 10.1 | — | 1.8 | 1.8 | 20 | 140 min. |
| Ex. 4 | 1.4 | 66.4 | 6.8 | 15.2 | 6.8 | 1.7 | 1.7 | 32 | 30 min. |
| Ex. 5 | 1.4 | 68.3 | 13.6 | 13.3 | 6.8 | 1.7 | 1.7 | 42 | 60 min. |
| Ref. | 1.5 | 73.4 | 14.6 | 10.5 | — | — | — | 31 | 240 min. |

Remarks:
PA: polyamide 12, Ph: phenol, EG: ethylene glycol, Gr: glycerol, Pr: 1-propanol, PEG: polyethylene glycol, PPG: polypropylene glycol
Examples 1 to 5: Almost no agglomerated particles were observed.
Reference Example: A large number of agglomerated particles were observed.

As is shown in Table, the addition of a high molecular weight alkylene glycol to the mixture solution shortens the period of time required for starting cloudiness and further reduces production of agglomerated particles.

What is claimed is:

1. A process for producing porous polyamide particles which comprises the steps of mixing a polyamide solution of polyamide 11 or polyamide 12 dissolved in a phenol compound and a low molecular weight aliphatic alcohol which is a poor solvent for the polyamides but is compatible with the phenol compound in the presence of a high molecular weight alkylene glycol to prepare a mixture solution having an initial viscosity of 10 mPa·s or more, and allowing the mixture solution to stand, to precipitate the polyamide particles.

2. The process of claim 1, wherein the mixture solution is prepared by mixing the polyamide solution containing the high molecular weight alkylene glycol with the low molecular weight aliphatic alcohol.

3. The process of claim 1, wherein the mixture solution is prepared by mixing the polyamide solution with the low molecular weight aliphatic alcohol containing the high molecular weight alkylene glycol.

4. The process of claim 1, wherein the mixture solution is prepared by simultaneously mixing the polyamide solution, the low molecular weight aliphatic alcohol, and the high molecular weight alkylene glycol.

5. The process of claim 1, wherein the mixture solution is prepared by mixing the polyamide solution and the low molecular weight aliphatic alcohol, and then mixing the high molecular weight alkylene glycol.

6. The process of claim 1, wherein the mixture solution is prepared to have a polyamide concentration in the range of 0.05 to 20 wt. %.

7. The process of claim 1, wherein the mixture solution is prepared to have a high molecular weight alkylene glycol concentration in the range of 0.5 to 10 wt. %.

8. The process of claim 1, wherein the phenol compound is phenol.

9. The process of claim 1, wherein the low molecular weight aliphatic alcohol is a mixture of a trihydric alcohol and a low molecular weight alkylene glycol or a mixture of a trihydric alcohol and a monohydric alcohol.

10. The process of claim 9, wherein the trihydric alcohol is glycerol.

11. The process of claim 1, wherein the low molecular weight aliphatic alcohol is a mixture of glycerol and ethylene glycol.

12. The process of claim 1, wherein the low molecular weight aliphatic alcohol is a mixture of glycerol and a monohydric alcohol having 1 to 6 carbon atoms.

13. The process of claim 1, wherein the high molecular weight alkylene glycol is polyethylene glycol having a number average molecular weight of 1,000 or more, polypropylene glycol having a number average molecular weight of 1,000 or more, or a mixture thereof.

14. The process of claim 1, wherein the initial viscosity of the mixture solution is not higher than 200 Pa·s.

15. The process of claim 1, wherein the step of allowing the mixture solution to stand is performed for at least 30 minutes.

16. The process of claim 1, wherein the step of allowing the mixture solution to stand is performed at a temperature in the range of 20 to 80° C.

* * * * *